Figure 1:
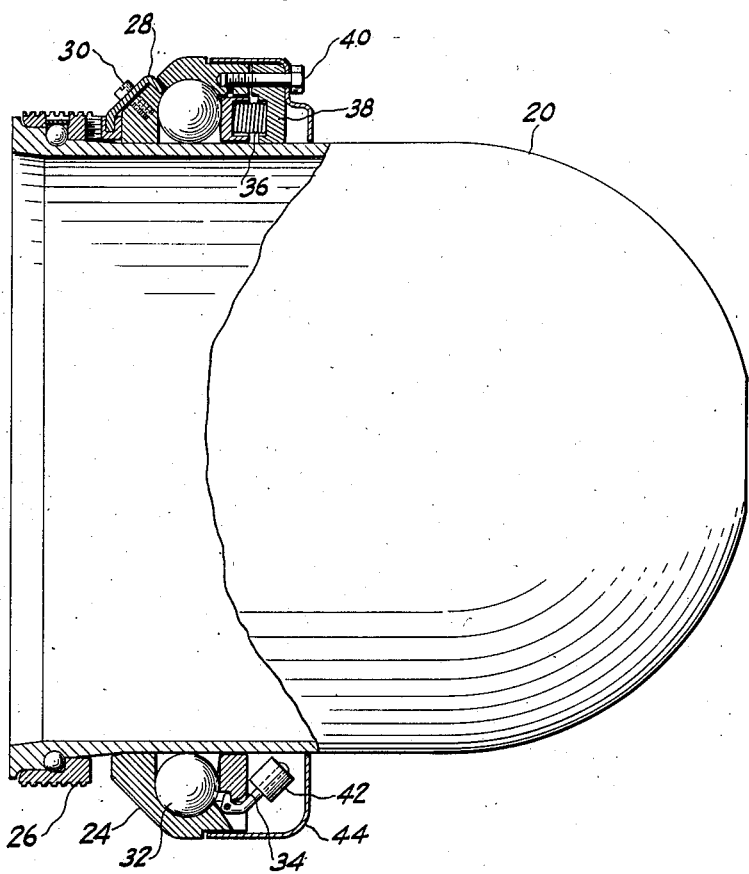

Jan. 9, 1940.                E. MARTIN                2,186,199
                      PROPELLER BALANCING MEANS
                       Filed Dec. 29, 1938         2 Sheets-Sheet 1

INVENTOR
*Erle Martin*
BY *Harris G. Luther*
ATTORNEY

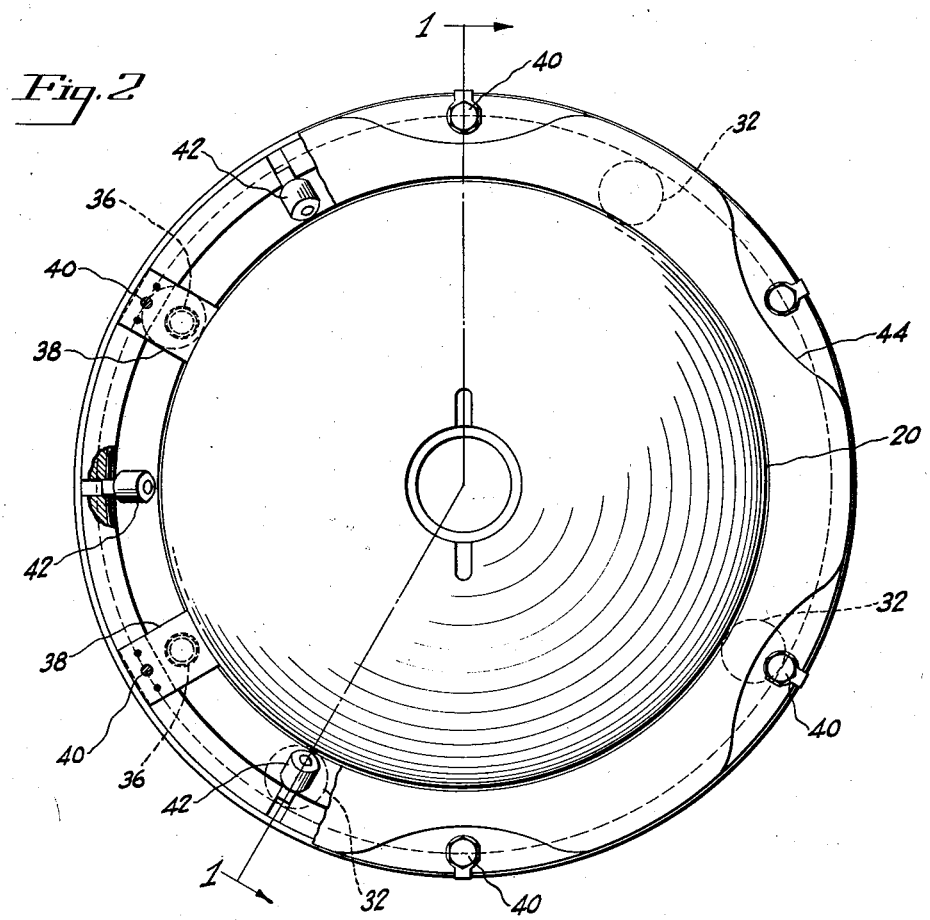

Patented Jan. 9, 1940

2,186,199

UNITED STATES PATENT OFFICE 2,186,199

PROPELLER BALANCING MEANS

Erle Martin, West Hartford, Conn., assignor to United Aircraft Corporation, East Hartford, Conn., a corporation of Delaware Application December 29, 1938, Serial No. 248,281

8 Claims. (Cl. 170—177)

This invention relates to improvements in means for damping or reducing the vibration of rotating bodies and has particular reference to improved means for automatically balancing a rotating body such as an aircraft propeller so that the cause of certain types of vibration may be substantially eliminated.

An object of the invention resides in the provision of improved means for automatically balancing a rotating body such as an airplane propeller against lateral vibration.

A further object resides in the provision of centrifugally actuated means for automatically releasing the balancing means to render the same operative when a predetermined rotational speed is reached.

A still further object resides in the provision of means for conveniently mounting such a device on a structure such as an airplane propeller without an unreasonable increase in the weight of the structure.

Other objects and advantages will be more particularly pointed out hereinafter or will become apparent as the description proceeds.

In the accompanying drawings, there is illustrated by way of example, one particular form of device constructed according to the invention. The drawings, however, are for the purpose of illustration only and are not to be taken as limiting or restricting the scope of the invention as set forth in the appended claims.

In the drawings,

Fig. 1 is a side elevational view of a portion of a propeller hub, a portion thereof being broken away and shown in section to illustrate the application of the device of the invention thereto.

Figure 3:
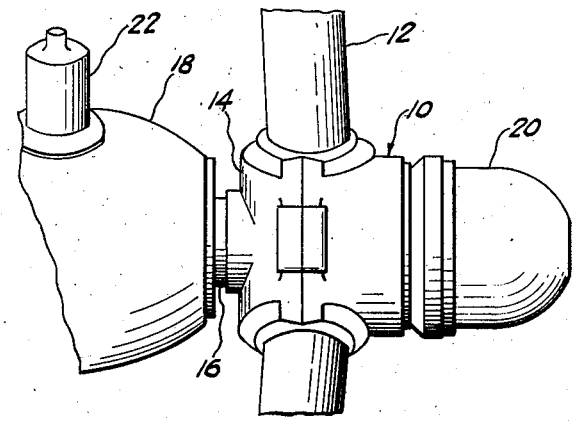

Fig. 2 is an end elevational view of the propeller hub portion shown in Fig. 1 with a balancing device constructed according to the invention applied thereto, a portion of the cover of the balancing device being omitted to illustrate the construction of the device, and Fig. 3 is a perspective view of an aeronautical propeller with a portion of the propeller driving engine showing the application thereto of a vibration balancing device constructed according to the invention.

Referring to the drawings in detail, and particularly to Fig. 3, the numeral 10 generally indicates an aeronautical propeller having a plurality of blades 12 mounted at their root or base ends in a hub structure 14 carried upon a propeller drive shaft 16. The drive shaft 16 projects from the nose piece 18 of a propeller driving engine. The propeller may be a controllable-pitch constant-speed propeller of a form well known to the art in which case the propeller may be provided with a casing or cylinder 20 enclosing the pitch changing mechanism such as an hydraulic or electric motor and the engine may be provided with a speed-controlling governor 22 operatively connected with the propeller pitch controlling mechanism to adjust the propeller pitch and thereby maintain the speed of the engine substantially constant at a rate determined by the speed responsive governor.

An annular ball race 24 is mounted on the propeller so that its center is substantially concentric with the geometrical axis of the propeller and drive shaft 16. The annular race 24 may be conveniently mounted upon the casing 20 since such a casing may conveniently be cylindrical or dome shaped and concentric with the geometrical center of the propeller. The race 24 should be located as near to the center of mass of the propeller as is convenient. In the construction illustrated, such a convenient location is found to be upon that portion of the casing 20 immediately adjacent to the neck 26 by means of which the casing is secured to the propeller hub 14. The race 24 may be secured in position against movement axially of the casing 20 and rotation relative thereto by suitable means such as clips 28 each having a prong projecting into a corresponding recess in the nut 26 and an additional prong projecting into a suitable recess provided in the race 24 and secured to race 24 by screws as indicated at 30.

A plurality of relatively heavy spherical metal balls 32 are disposed in the race 24 and are releasably held against movements relative to the race by means of a pressure plate 34 resiliently urged into the open end of the annular race and against the balls 32 by means of small compression springs, as indicated at 36, which abut at their ends opposite the ends engaging the pressure plate 34 against suitable anchor members 38 secured to the race ** by cap screws, as indicated at 40. The pressure plate 34 is moved against the force of the springs 36 to release the balls 32 by means of pivoted centrifugally actuated weights, as indicated at 42, pivotally secured to the race 24 and provided with lever portions engaging the pressure plate 34. The open end of the race 24 and the pressure plate 34 and centrifugal elements 42 may be enclosed by an annular cover member 44 which may be secured to the race 24 by the cap screws 40.

In operation the balls 32 tend to space themselves about the race 24 when the rotating body reaches a critical or predetermined speed in such a manner as to accurately balance the rotating mass and eliminate vibration incident to the rotation of a mass not accurately balanced about the axis of rotation or, in other words, to cause the geometrical center of the propeller to coincide with the center of rotation thereof. However, if the balls are free to move at all times they may at rotational speeds below such predetermined or critical speeds arrange themselves in such a manner as to materially increase the unbalance of the rotating body. It is, therefore, preferable at the beginning of rotation of the body to have the balls equally spaced about the annular retaining race and to maintain them in such equally spaced condition until a predetermined speed is reached. The spring 36 and the centrifugally actuated weights 42 are so proportioned that the weights will overcome the spring force at the proper rotational speed and release the balls 32 to move to the proper relative position to correct the unbalance of the rotating mass.

The operation of the device is substantially as follows: When the propeller is rotating below its critical speed, if it is out of balance the heavy side of the propeller will swing outwardly in a circle about the axis of the propeller shaft bearing.

For a mathematical explanation and demonstration of the above statement, reference may be had to "Mechanical Vibrations" by J. P. Den Hartog, published in 1934 by the McGraw-Hill Book Co., Inc., particularly to Chapter VI of this text.

As stated above, the balls are first arranged in equally spaced arrangement around the propeller hub so that they do not affect the balance of the propeller and are held in that position by the pressure plate. The pressure plate springs and the centrifugal weights opposing them are so proportioned that the balls are not released until the propeller rotates at a speed well above its critical speed, at which time the portion of the ball race angularly coincident with the light side of the propeller is further from the center of rotation of the propeller than the opposite side. Under these conditions, as soon as the balls are released they will move, under the action of centrifugal force, to the portion of the race angularly coincident with the light side of the propeller and will arrange themselves to correct the balance of the propeller and bring the center of rotation into substantial coincidence with the geometric center of the propeller. As the propeller speed is reduced the pressure plate will engage the balls before the critical speed is reached and will retain the balls in the proper balancing arrangement at all speeds below the speed at which the plate is moved to release the balls.

If the propeller balance changes or the balls are accidentally displaced, balance may be restored by, preferably, first arranging the balls at equally spaced intervals around the race, and then bringing the propeller speed up to the value at which the centrifugal weights move the pressure plate to release the balls for free movement in the ball race, so that the balls may rearrange themselves to rebalance the propeller.

If desired, where the speed is controlled by some speed responsive means such as the governor 22 of Fig. 3, the spring 36 and weights 42 may be so proportioned that the pressure plate 34 will not be released at any speed for which the governor is ordinarily adjusted. Operation of the balancing means can then be obtained by temporarily adjusting the governor to provide a speed greater than the normal speed by an amount sufficient to release the balls 32 after which the governor may be returned to a previous adjustment and the balls will then be retained in their balancing positions by the pressure plate 34 as long as the speed is not permitted to exceed the normal speed range of the governor. Thus, an airplane propeller may be balanced by first arranging the balls in an equally spaced condition about the ball race 24, then temporarily operating the propeller at a rotational speed higher than any speed normally used in the operation of the airplane for which the propeller furnishes the motive power. As soon as the balls become suitably arranged at the high rotational speed indicated, the speed may be decreased and the balls will then remain in position to properly balance the propeller until some event occurs to again upset the propeller balance.

While one particular mechanical arrangement has been hereinabove described and illustrated in the accompanying drawings for the purpose of disclosing the invention, it is to be understood that the invention is in no way limited to the particular arrangement so illustrated and described but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. A balancing device for a rotatable body comprising, an internally grooved annular race coaxial with the axis of rotation of said body, a plurality of loose spherical weights in said race, means for releasably securing said weights in fixed position relative to said race, and centrifugally actuated means for controlling said weight securing means.

2. A balancing device for a rotatable body comprising, an annular race secured to said body substantially concentric with the axis of rotation thereof, a plurality of loose spherical weights carried internally of said race, a pressure plate for releasably securing said weights in fixed position relative to said race, and centrifugally actuated members for moving said pressure plate to release said weights whenever said body rotates at or above a predetermined speed.

3. In combination with an aeronautical propeller having a hub portion, means for balancing said propeller against radial unbalance forces comprising, an annular race on said hub portion substantially coaxial with the axis of rotation of said propeller, a plurality of spherical weights loosely carried in said annular race, an annular pressure plate for securing said weights in fixed position relative to said race, and centrifugally actuated members operatively connected with said pressure plate to move the same to release said weights whenever the propeller rotates at or above a predetermined speed.

4. In combination with an engine driven propeller and a speed governor therefor, means for balancing said propeller for smooth rotation about its geometrical axis comprising, an annular race secured to said propeller substantially concentric with said geometrical axis, a plurality of spherical weights in said race, means releasably securing said weights against movement relative to said race, and centrifugally actuated means operative to release said weights for movement relative to said race only when said propeller rotates at a speed greater than the normal maximum speed setting of said governor.

5. In combination with an engine driven propeller and a speed governor therefor, means for balancing said propeller for smooth rotation about its geometrical axis comprising, an annular race secured to said propeller substantially concentric with said geometrical axis, a plurality of spherical weights in said race, means releasably securing said weights against movement relative to said race, and centrifugally actuated means operative to release said weights for movement relative to said race only when said propeller rotates at a speed above the normal flight range of propeller speeds as determined by said governor.

6. A balancing device for an airplane propeller having a hub portion including a cylindrical casing concentric with said propeller and secured thereto at one end by an annular nut comprising, an annular race encircling said casing adjacent to said nut and having a portion in contact with said casing, a plurality of spherical weights retained in an annular internal groove in said race, a pressure plate facing said groove to restrain said weights against movement relative to said race, springs carried by said race for urging said pressure plate into position to restrain said weights against movement relative to said race, centrifugally actuated means to move said pressure plate to release said weights whenever said propeller rotates at or above a predetermined speed, and means securing said race to said nut.

7. A balancing device for an airplane propeller having a hub portion including a cylindrical casing concentric with said propeller and secured thereto at one end by an annular nut comprising, an annular race encircling said casing adjacent to said nut and having a portion in contact with said casing, a plurality of spherical weights retained in an annular internal groove in said race, a pressure plate facing said groove to restrain said weights against movement relative to said race, springs carried by said race for urging said pressure plate into position to restrain said weights against movement relative to said race, centrifugally actuated means to move said pressure plate to release said weights whenever said propeller rotates at or above a predetermined speed, and means securing said race to said nut comprising a plurality of clips each having a detent received in an aperture in said nut and a detent received in an aperture in said race, and one or more cap screws securing each clip to said race.

8. A balancing device for an airplane propeller having a hub portion including a blade supporting structure, a casing having a cylindrical open end received in an aperture in said blade receiving structure and positioned substantially concentric with the center of said blade receiving structure, and an annular nut surrounding the end of said casing screw threaded into and locked to said blade supporting structure to secure said casing to said propeller, said balancing device comprising, an annular race having an annular portion in contact with said casing, an internally grooved annular portion, and an annular portion extending away from said grooved portion on the side opposite said casing contacting portion and spaced from said casing, a plurality of spherical weights loosely retained in said internally grooved annular portion, an annular pressure plate in said annular portion spaced from said casing, a plurality of springs carried by said race to urge said pressure plate against said weights to restrain them against movement relative to said race, centrifugally actuated members carried by said race to move said pressure plate against the force of said springs to release said weights whenever said propeller rotates at or above a predetermined speed, and means rigidly securing said race to said nut to restrain the race against movement relative to said casing.

ERLE MARTIN.